Patented July 27, 1948

2,446,101

UNITED STATES PATENT OFFICE 2,446,101

CREAMING OF SYNTHETIC RUBBER LATICES

Charles R. Peaker, Union City, Conn., assignor to United States Rubber Company, New York, N. Y., a corporation of New Jersey No Drawing. Application June 25, 1947, Serial No. 757,071

4 Claims. (Cl. 260—8)

This invention relates to the improvements in creaming of synthetic rubber latices.

This application is a continuation-in-part of my application Serial No. 597,963, filed June 6, 1945, now abandoned.

Synthetic rubber latices, as is known, may be prepared by the emulsion polymerization in an aqueous medium of butadiene-1,3 hydrocarbons or mixtures of butadiene-1,3 hydrocarbons with other polymerizable compounds capable of forming copolymers with butadiene-1,3 hydrocarbons. Such aqueous emulsion polymerizates, or synthetic rubber latices, may be creamed by the addition of a hydrophilic colloidal creaming agent, such as is used for creaming natural rubber latex, which will cause the dispersion on standing to separate into a polymer-rich fraction and a polymer-poor fraction, which fractions may be separated from each other by simple mechanical means, such as decantation, drawing-off, and the like.

By the present invention, there is obtained an increase in the concentration of synthetic rubber in the polymer-rich or cream fraction in the creaming of synthetic rubber latices with hydrophilic colloidal creaming agents.

In carrying out the present invention, the pH of the synthetic rubber latex is reduced to between 4.5 and 6.5 in the presence of a small amount of glue, the pH is then raised to above 9, and the latex is thereafter creamed with a hydrophilic colloidal creaming agent. The improvement claimed in the present case is the result of the presence of glue in the latex when the pH is lowered and then raised before creaming. Raising and lowering the pH of the synthetic rubber latex before creaming in the absence of glue will itself give a higher cream solids than creaming of untreated latex, and this is the subject matter of other patent applications than those of the present inventor. By the present invention a still further increase in concentration of solids in the cream is obtained when glue is present in the synthetic rubber latex before the pH is lowered and again raised before creaming.

The hydrophilic colloidal creaming agent may be the conventional vegetable mucilages used in the creaming of natural latex, for example, alginates, locust seed or carob bean gum, pectates, karaya gum, Irish moss, and the like. These vegetable mucilages may be used in amounts between .05 to 1% based on the water phase of the synthetic rubber latex similarly to the creaming of natural rubber latex. The glue may be any of the well-known commercial products. The amount of glue in the synthetic rubber latex before lowering and raising the pH is not critical. As little as .01% by weight of glue based on the latex solids will show a decided improvement in creaming some latices as shown in Example III below, and as much as 2% of glue based on the latex solids will give the improved results of the present invention as shown in Example II. The pH of the latex may be reduced to between 4.5 and 6.5 without irreversibly coagulating the latex in any desired manner, as by the addition of an acid, or by the addition of a salt and the liberation of acid from such a salt in the latex. Examples of the latter are salts which hydrolyze in aqueous solution to form acid in situ, such as silicofluorides which liberate free hydrofluoric acid, and ammonium salts followed by the addition of formaldehyde, which forms hexamethylene tetramine and liberates free acid from the ammonium salt in situ. Additional stabilizer may be added to the latex before reducing the pH if desired, as is known, e. g. Willson Patent No. 2,357,861. The pH of the latex may be raised to above 9 after lowering to between 4.5 and 6.5 by addition of an alkaline material having a monovalent cation, such as, an alkali of the group consisting of alkali-metal hydroxides, ammonium hydroxide and amines. These various means for raising and lowering the pH are illustrated in the different examples below.

In the preparation of the synthetic rubber latex, as is known, polymerizable monomeric compounds are emulsified in water with the aid of an emulsifying agent, such as a soap or other surface-active agent, and the polymerization is made to take place generally at elevated temperatures in the presence of a catalyst and other regulating materials. Such polymerizable material may be one or a mixture of butadiene-1,3 hydrocarbons, for example, butadiene-1,3, methyl-2-butadiene-1,3 (isoprene), piperylene, 2,3-dimethylbutadiene-1,3. The polymerizable material as is known may be a mixture of one or more of such butadiene-1,3 hydrocarbons with one or more other polymerizable compounds which are capable of forming rubbery copolymers with butadiene-1,3 hydrocarbons, for example, up to 70% of such mixture of one or more compounds which contain a $CH_2=C<$ group where at least one of the disconnected valences is attached to an electro-negative group, that is, a group which substantially increases the electrical dissymmetry or polar character of the molecule, such group being other than H or $CH_3$. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The following examples are illustrative of the invention, all parts referred to therein being by weight:

Example I

A 27% solids synthetic rubber latex was prepared by polymerizing an aqueous emulsion of 75 parts of butadiene-1,3 and 25 parts of styrene in the presence of 5 parts of a commercial sodium stearate soap used as an emulsifying agent in the synthetic rubber industry, and small amounts of conventional oxidizing catalyst and aliphatic mercaptan regulator. The emulsion was polymerized at 45 to 50° C. for about 14 hours. The residual monomers were removed by steam distillation and the resultant latex had a solids content of 27%. The conversion from monomers to polymers was about 75%. The latex had a pH of 8–8.5.

Portions of this latex were creamed for 2 days at room temperature with about .3% ammonium alginate based on the water phase, with and without the prior addition of 1% commercial animal glue based on the polymer solids. The total solids in the cream in each case was 38%, showing that the glue had no effect on the straight creaming of the latex with vegetable mucilage.

To two other portions of the latex were added, respectively, 1 part of a commercial stabilizer, dodecyl sodium sulfate as a 10% aqueous solution, and 1.5 parts of potassium oleate as a 20% aqueous solution per 100 parts of solids of the latex to stabilize the respective latex portions against coagulation on reduction of the pH. Water was then added in each case to reduce the solids content to 15% and the pH's were lowered by adding 44 parts per 100 parts of solids of the latex of a 10% aqueous solution of ammonium chloride containing 1.7% free ammonia (NH$_3$), followed by 42 parts per 100 parts of solids of the latex of a 10% aqueous formaldehyde solution. The ammonia concentration of the ammonium chloride salt solution is not critical, the free ammonia being added merely to prevent any local coagulation of the latex on addition of the salt solution. After the formaldehyde solution was added, the latex was stirred only until the formaldehyde was uniformly distributed (about ½ to 1 minute). The whole mixture was then allowed to stand while the pH fell slowly during a period of 15 minutes, due to the slow reaction between the ammonium chloride and formaldehyde, which forms hexamethylene tetramine, and liberates free hydrochloric acid in situ. The pH of the latex to which the dodecyl sodium sulfate stabilizer had been added dropped to 6.1 and the pH of the latex to which the potassium oleate stabilizer had been added dropped to 6.3 on addition of the ammonium chloride and formaldehyde. The latex may be gently stirred during the period of falling pH, but it is preferred not to violently agitate the latex due to the reduced stability at lower pH's. The latex portions were then restabilized by the addition of 25 parts of 28% aqueous ammonia per 100 parts of latex solids which raised the pH of the latex portions to about 9–9.5. Portions of the thus treated latex were then creamed from about 12% solids for two days at room temperature with about .3% ammonium alginate based on the water phase. The solids content of the cream from the latex to which the dodecyl sodium sulfate had been added before lowering and raising the pH was 47%, and the solids of the cream from the latex to which the potassium oleate had been added was 45%. To other portions of the thus treated latex were added .5 parts of glue per 100 parts of solids of the synthetic latex before adding the dodecyl sodium sulfate and potassium oleate and lowering and raising the pH and creaming with the .3% ammonium alginate as above. The pH of the latex in these cases was lowered to within the range 6.2 to 6.5 and raised to about 9–9.5. The solids content of the cream from the latex containing the glue and to which the dodecyl sodium sulfate had been added before lowering and raising the pH was 64%, and the solids of the cream from the latex containing the glue to which the potassium oleate had been added was 61%, showing a considerable increase in the cream solids where the glue was added prior to lowering and raising the pH and then creaming.

Example II

The concentration of glue in the synthetic rubber latex prior to lowering and raising the pH of the latex is not critical as shown in the following:

To other portions of the latex of Example I were added .5, 1.0 and 2.0 parts respectively of glue per 100 parts of solids of the latex before adding 1 part of dodecyl sodium sulfate stabilizer, diluting, and lowering and raising the pH and creaming, as in Example I. To still other portions of the latex of Example I were added .25 and .5 part respectively of glue per 100 parts of latex solids before adding 1.5 parts of potassium oleate stabilizer, diluting, and lowering and raising the pH and creaming, as in Example I. The pH of the latex portions was lowered to within the range 6.1 to 6.4 and raised to 9–9.5, and the latex portions were creamed from about 12%. The concentration of cream solids where .5, 1.0 and 2.0 parts of glue were added with the dodecyl sodium sulfate stabilizer were 63%, 63% and 59% respectively. The concentration of cream solids where .25 and .5 part of glue were added with the potassium oleate stabilizer were 54% and 61% respectively. With the synthetic rubber latex of Example I, about .5 part of glue per 100 parts of the latex solids should be used to obtain the full benefit of the glue, but up to 2 parts of glue does no harm.

Example III

This example illustrates the case of a latex where much smaller amounts of glue than used in Examples I and II will give a definite advantage in the creaming operation.

A synthetic rubber latex was prepared similarly to the latex of Example I from an aqueous emulsion of 75 parts of butadiene-1,3 and 25 parts of styrene, but with 5 parts of the potassium soap of castor oil (potassium ricinoleate), instead of the sodium stearate soap of Examples I and II, as the emulsifying agent. The solids concentration of the latex was 33.8% and it had a pH of approximately 9.5.

To 296 parts of the latex (100 parts latex solids) were added 10 parts of a 10% aqueous solution of dodecyl sodium sulfate, 50 parts of an aqueous solution containing 5% ammonium acetate and .7% free ammonia. Forty-four parts of 10% aqueous formaldehyde were then added and the latex allowed to stand 15 minutes, lowering the pH to 5.4. Ten parts of 28% aqueous ammonia were added raising the pH to about 9. The thus treated latex was creamed at 24% solids concentration for two days at room temperature with 0.5 part of ammonium alginate per 100 parts of latex solids (optimum value), giving a 49% solids cream. An amount of the thus treated latex containing 80 parts polymer was mixed with an amount of the original untreated latex containing 20 parts polymer and the mixture creamed from 25% solids with 0.6 part of ammonium alginate per 100 parts latex solids (optimum value), giving a 50% solids cream.

Another portion of the original synthetic rubber latex was treated as above by addition of dodecyl sodium sulfate and lowering and raising the pH after the addition to the latex of .01 part of glue per 100 parts of the latex solids. An amount of the thus treated latex containing 80 parts polymer was mixed with an amount of the original untreated latex containing 20 parts polymer and the mixture creamed from 25% solids with 0.6 parts of ammonium alginate per 100 parts of latex solids (optimum value). In this case the cream portion of the mixture gave a 55% solids cream, as compared to a 50% solids cream where the .01% of glue based on the latex solids had not been added before lowering and raising the pH of the latex.

*Example IV*

In this case a synthetic rubber latex was prepared similarly to the latex of Example I but with 50 parts of butadiene-1,3 and 50 parts of styrene instead of the 75:25 ratio of Example I. The final latex had a solids content of 27.1% and a pH of 8–8.5. To 369 parts of the latex (100 parts latex solids) was added 2 parts of a 25% aqueous glue solution, 10 parts of a 10% aqueous solution of dodecyl sodium sulfate, and water to a dilution of 15% solids content. The pH was reduced to 6.2 by addition of 44 parts of an aqueous solution containing 10% ammonium chloride and 1.7% ammonia, and 42 parts of 10% aqueous formaldehyde and allowing the latex to stand for about 15 minutes. The pH of the latex was then raised to about 9 by the addition of 25 parts of a 25% aqueous solution of dimethylamine. The latex was then creamed for 2 days at room temperature from 12% solids concentration with .23% of ammonium alginate based on the water phase of the latex (1.8 parts per 100 parts of latex solids). The solids concentration of the cream was 60.4% as compared to a solids concentration of 45 to 50% without the glue addition.

*Example V*

In this example the pH of the latex was lowered by the addition of a salt, viz., sodium silicofluoride, which liberates free hydrofluori acid in situ.

To 375 parts of a 26.7% solids latex having a pH of 8–8.5, prepared by polymerizing equal parts of butadiene-1,3 and styrene as in Example IV, was added 2 parts of a 25% aqueous solution of glue, 10 parts of a 10% aqueous solution of dodecyl sodium sulfate, 250 parts of water, and 3 parts of a 33% aqueous paste of sodium silicofluoride. After 5 minutes, the pH of the latex had dropped to 5.6, due to the hydrolysis of the sodium silicofluoride and liberation of hydrofluoric acid. Four parts of 28% aqueous ammonia was added to raise the pH to about 9.5, and the thus treated latex was creamed with 25 parts of a 2% aqueous solution of ammonium alginate. After 48 hours at room temperature, the serum layer was drawn off, leaving a 58.2% solids concentration cream. Without the glue, the solids concentration of the cream is about 38%.

*Example VI*

In this example, the pH of the latex was raised by the addition of fixed alkali.

A synthetic rubber latex was prepared similarly to the latex of Example I from an aqueous emulsion of 71 parts of butadiene-1,3 and 29 parts of styrene. A conversion of about 75% was obtained, giving a 29.2% solids latex having a pH of about 9.

To a portion of the above latex containing 100 parts solids was added 1 part of dodecyl sodium sulfate as a 10% aqueous solution and 0.5 part of commercial glue as a 25% aqueous solution, and the mixture diluted to 15% solids. There was then added 44 parts of a 10% aqueous solution of ammonium chloride containing 1.7% free ammonia, followed by 42 parts of 10% aqueous formaldehyde solution. The thus treated latex was allowed to stand for 15 minutes, the pH falling to 5.7–5.8. After this interval, 25 parts of 20% aqueous potassium hydroxide was added, raising the pH to 10.8. The latex was then creamed using approximately 0.2% ammonium alginate based on the water phase present. The latex creamed in 48 hours to a 62.2% total solids cream. Another portion of the original latex was treated in the same manner except no glue was added. The latex creamed to 46.8% solids.

*Example VII*

In this example, the pH of the latex was lowered by the addition of acid directly.

To 224 parts of the latex of Example VI was added 1 part of dodecyl sodium sulfate as a 10% aqueous solution and 0.5 part of commercial glue as a 25% aqueous solution. 6 parts of 40% aqueous acetic acid was added, lowering the pH to 4.5. After standing 15 minutes, 7 parts of 28% aqueous ammonia were added, raising the pH to 9.7. To the thus treated latex was added 96 parts of the original 29.2% solids latex which had not been treated with acid and alkali in this manner, and the mixture was creamed with 28 parts of 2% aqueous solution of ammonium alginate. The cream solids after 48 hours was 58.2%. In a run similar to the above where the addition of glue was omitted, the solids concentration of the cream was 50.8%.

*Example VIII*

This example shows that to obtain the full benefit of the present invention, the glue should be present in the latex before the pH is lowered.

To a portion of the 29.2% latex of Example VI containing 100 parts solids, was added 1 part of dodecyl sodium sulfate as a 10% aqueous solution and 0.5 part of commercial glue as a 25% aqueous solution, and the mixture diluted to 15% solids. 44 parts of a 10% aqueous solution of ammonium chloride containing 1.7% free ammonia were added, followed by 42 parts of 10% aqueous formaldehyde solution. After standing 15 minutes, the pH fell to 5.7. 25 parts of 28% aqueous ammonia were then added, raising the pH to 10.8. The latex was then creamed using 0.2% ammonium alginate based on the water phase present. The latex creamed in 48 hours to a 59.8% total solids cream. In a similar run where the glue was added after the pH had been lowered and just before the addition of the ammonia, the total solids of the cream was 50.3%. Where the glue was added after the pH was raised by the ammonia addition following the lowering of the pH, the total solids of the cream was 46.3%. Where no glue was added the total solids of the cream was 43.2%.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A process for creaming a synthetic rubber latex which comprises reducing the pH of an alkaline aqueous soap emulsion polymerizate of polymerizable material selected from the group consisting of butadiene-1,3 hydrocarbons and mixtures of butadiene-1,3 hydrocarbons with compounds which contain a $CH_2=C<$ group and are capable of forming copolymers with butadiene-1,3 hydrocarbons to between 4.5 and 6.5 by incorporating an acid therein, in the presence of 0.01 to 2% based on the latex solids of glue in the latex without irreversibly coagulating the aqueous emulsion polymerizate, raising the pH of the thus treated emulsion polymerizate to above 9 by the addition thereto of a material of the group consisting of alkali-metal hydroxides, ammonium hydroxide and amines, and creaming the thus treated emulsion polymerizate with a vegetable mucilage.

2. The process of claim 1 in which the pH is reduced by forming the acid in situ in the latex.

3. The process of claim 1 in which the pH is reduced by the addition of ammonium chloride and formaldehyde to the latex.

4. The process of claim 1 in which the pH is reduced by the addition of ammonium chloride and formaldehyde to the latex and in which the pH is raised by the addition of ammonium hydroxide to the latex.

CHARLES R. PEAKER.

REFERENCES CITED

The following references are of record in the file of this patent:

UNITED STATES PATENTS

| Number | Name | Date |
|---|---|---|
| 2,357,861 | Willson | Sept. 12, 1944 |
| 2,391,817 | Blackburn | Dec. 25, 1945 |
| 2,393,261 | Peaker | Jan. 22, 1946 |

OTHER REFERENCES

Mueller, India Rubber World, vol. 107, Oct. 1942 pp. 33–35.